United States Patent [19]
Clampett

[11] 3,879,959
[45] Apr. 29, 1975

[54] FLEXIBLE COUPLING

[75] Inventor: John William Clampett, Rayleigh, England

[73] Assignee: Ford Motor Company, Dearborn, Mich.

[22] Filed: July 2, 1973

[21] Appl. No.: 375,577

[52] U.S. Cl. .............. 64/14; 64/11 R; 64/27 NM; 74/470
[51] Int. Cl. ............................................. F10d 3/64
[58] Field of Search... 64/27 NM, 27 R, 17 R, 17 SP, 64/14, 11; 74/470

[56] References Cited
UNITED STATES PATENTS

| 2,208,547 | 7/1940 | Murphy | 61/17 R |
| 2,267,904 | 12/1941 | Evans | 64/14 |
| 2,533,789 | 12/1950 | Goodchild | 64/11 |
| 2,783,626 | 3/1957 | Klomp | 64/17 R |
| 2,951,354 | 9/1960 | Anderson | 64/14 |
| 3,310,959 | 3/1967 | Sheppard | 64/17 R |
| 3,342,041 | 9/1967 | Nebiker, Jr. | 64/11 R |

Primary Examiner—Samuel Scott
Assistant Examiner—Randall Heald
Attorney, Agent, or Firm—Clifford L. Sadler; Keith L. Zerschling

[57] ABSTRACT

A flexible coupling that is particularly suitable for use in connecting a steering shaft to a steering gear. The coupling has identical interchangeable first and second stamped metal yokes of generally U-shape. The yokes are nested together with a rubber member interposed therebetween. The rubber has a plurality of outwardly extending flanges or lugs which engage the yokes and provide a driving connection from one yoke to the other.

8 Claims, 5 Drawing Figures

FLEXIBLE COUPLING

BACKGROUND OF THE DISCLOSURE

This invention relates generally to flexible couplings, and more particularly to flexible couplings of the type used for transmitting rotary movement from the steering wheel and shaft of a motor vehicle to the input shaft of the steering gear. The desired characteristics of such a coupling are simplicity of construction for reduced manufacturing costs and reliability of operation.

Flexible couplings now in use for connecting the steering shaft to the steering gear commonly depend on a bond between a rubber member and a metal member. The present invention renders the bonding unnecessary.

BRIEF SUMMARY OF THE DISCLOSURE

A flexible coupling or joint according to this invention is usable for joining first and second shafts together to transmit the rotary movement of one shaft to the other. In one embodiment of the joint:

a. a first yoke member is generally U-shape and the free ends of the arms of the U are connectable to a first shaft;

b. a second yoke member is also U-shape and the free ends of its arms are connectable to a second shaft;

c. the base of the first yoke member is interposed in the gap separating the arms of the second member while the base of the second member spans the gap separating the arms of the first member; and d. a rubber or like element is located between the bases and arms of the members and is connected mechanically to both of the members so that rotation of one member transmits rotation to the other member.

In the presently preferred embodiment, the arms of the U-shape members have apertures and the rubber element has projections that extend into the apertures.

Also in the preferred embodiment, the edges of the arms are turned outwardly so that the adjacent edges of the first and second U-shape members are spaced apart and parallel. The rubber element has lugs that project into the gap between each pair of adjacent edges so that when torque transmitted from one member to the other reaches a certain value, the lugs are compressed.

BRIEF DESCRIPTION OF THE DRAWINGS

The many objects and advantages of a flexible coupling constructed in accordance with this invention will become apparent upon consideration of the following detailed description and the accompanying drawings, in which.

DETAILED DESCRIPTION OF THE PREFERRED EMBODIMENT

Figure 1:
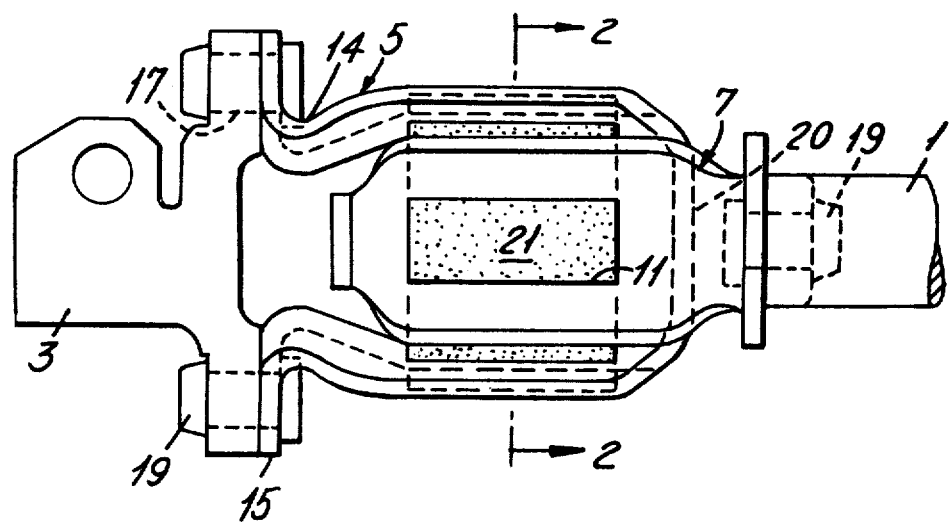
FIG. 1 is an elevational view of a flexible coupling constructed in accordance with the presently preferred embodiment of this invention.

Referring now to the drawings, wherein the presently preferred embodiment of this invention is shown, FIG. 1 illustrates a new flexible coupling constructed to join a pair of shafts. The coupling is used to transmit rotary movement from a first shaft 1 to a second shaft 3. The coupling includes identical first and second yoke members 5 and 7.

Figure 2:
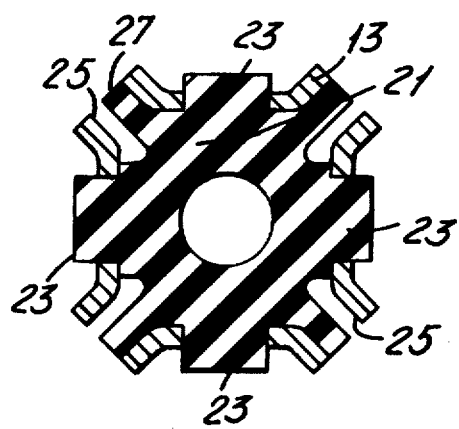
FIG. 2 is a sectional view taken along section line 2—2 of FIG. 1.
Figure 3:
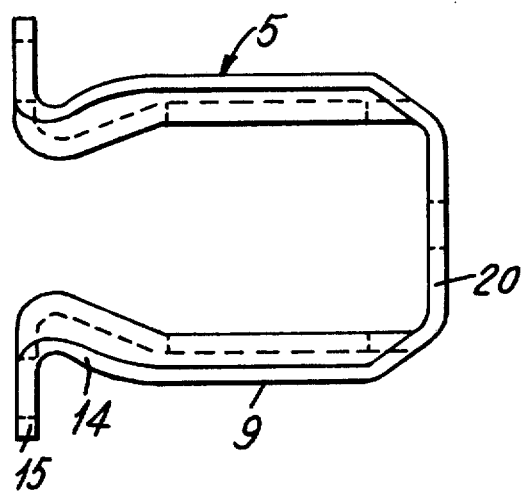
FIGS. 3 and 4 are elevational views of one of the U-shape yoke members which forms a part of the coupling of FIG. 1.
Figure 4:
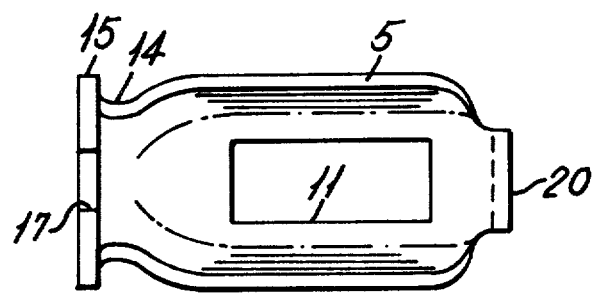
Figure 5:
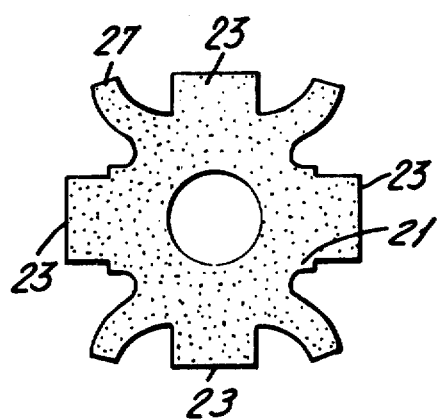
FIG. 5 is an elevational end view of the rubber element that is interposed between the yokes of the flexible coupling.

The member 5 is shown in FIGS. 3 and 4. It is generally U-shape and has a pair of arms 9 in each of which there is an aperture 11. The edges 13 of the arms 9 are turned outwardly (see FIG. 2) to form longitudinally extending flanges.

The free ends 14 of the arms 9 of yoke 5 are turned outwardly to form mounting flanges 15. The flanges 15 have holes 13 through which bolts 19 extend to connect the yoke member 5 to the first shaft 1.

The yoke member 7 is identical in construction with the yoke member 5 and the same reference numerals are used to describe similar portions thereof. The members 5 and 7 are arranged or nested together so that the base portion 20 of the member 5 spans the gap separating the free ends 14 of the arms 9 of the yoke member 7.

A resilient element 21, made of rubber or like material, is located between the bases 20 and the arms 9 of the yoke members 5 and 7. The rubber element 21 has four projections 23 that extend through the apertures 11 in the arms 9. The yoke members 5 and 7 are thus interconnected mechanically and the element 21 is not bonded to either member. The four projections 23 of rubber element 21 engage the periphery of the four openings 11 to form a driving connection between U-shape yoke members 5 and 7.

Adjacent turned out edges 13 of the arms 9 are parallel and are separated by gaps 25. The resilient element 21 has lugs or flanges 27 which extend into the gaps 25. The lugs 27, as can be seen from their unstressed shape in FIG. 4, are stressed when the resilient element 21 and the yoke members 5 and 7 are assembled as in FIG. 2. In their free state, the rubber flanges 27 are arcuate whereas when the rubber element 21 is assembled in the flexible coupling the flanges 27 become straight.

OPERATION

As will be appreciated from the preceding description, the yoke member 5 engages two of the protruding lugs 23 of the resilient member 21. Similarly, the yoke 7 engages two of the lugs 23. This interengagement permits the rubber member 21 to function as a driving connection between the yokes 5 and 7. In addition to providing a driving connection, the lugs 23 of the resilient member 21 also function to position the yoke 5 longitudinally with respect to the yoke 7.

When the torque transmitted from one shaft to the other exceeds a predetermined value, the element 21 yields and the driving yoke will be angularly displaced with respect to the driven yoke. If the value of the torque is sufficiently high, two diagonally disposed gaps 25 will close and the two lugs 27 trapped between the adjacent flanges 13 will become force transmitting elements.

Some of the outstanding features of a flexible coupling constructed in accordance with this invention are its simplicity of construction, its economy of manufacture and its reliability of operation. It should be noted in the latter regard that in the unlikely event the rubber should fail, the nesting arrangement of the yokes 5 and 7 will ensure a continuing driving connection.

The foregoing description presents the presently preferred embodiment of this invention. Modifications and alterations may occur to those skilled in the art which will come within the scope and spirit of the following claims.

I claim:

1. A flexible coupling for connecting a driving shaft and a driven shaft,
   said coupling comprises a pair of U-shape yoke members,
   said yoke members being constructed to be connected to said driving and driven shafts, respectively,
   a resilient member interposed between said yoke members and constructed to provide a driving connection therebetween,
   said yoke members each having apertures therein,
   said resilient member having radially extending lug portions protruding through said apertures in driving engagement with said yoke members.

2. A flexible coupling for connecting a driving shaft and a driven shaft,
   said coupling comprising a first U-shape yoke member and a second U-shape yoke member,
   each of said members having a pair of leg portions,
   each of said leg portions having a base end and an attachment end,
   each of said members having an integral base portion interconnecting said base ends of its pair of leg portions,
   said members being nested together with said base portion of said first member being interposed between said leg portions of said second member and said base portion of said second member being interposed between said leg portions of said first member,
   a resilient element interposed between said members and constructed to provide a driving connection therebetween,
   each of said leg portions having an aperture therethrough,
   said resilient element having lug portions extending radially through each of said apertures in driving engagement with said yoke members,
   said resilient element normally holding said first and second yoke members in fixed longitudinal and angular positions relative to each other,
   each of the edges of said leg portions extending in a generally radial direction with respect to the axis of ratation of said coupling to form longitudinally extending flanges,
   said edges of said first and second yoke members being arranged in spaced apart pairs,
   said resilient element having flange portions disposed between said spaced apart edges of each of said pairs,
   said flange portions being stressed into engagement with the edges of one of said yoke members and normally spaced from the edges of the other of said yoke members,
   said attachment ends of said leg portions of said first member being constructed to be connected to said driving shaft and said attachment ends of said leg portions of said second member being constructed to be connected to said driven shaft.

3. A flexible coupling for connecting a driving shaft and a driven shaft,
   said coupling comprising a first yoke member and a second yoke member,
   each of said members having a pair of longitudinally extending leg portions,
   a resilient element interposed between said pair of leg portions of said first member and between said pair of leg portions of said second member,
   each of said leg portions having an aperture therethrough,
   said resilient element having lug portions extending radially through each of said apertures in torque transmitting engagement with both of said yoke members,
   said lug portions of said resilient element normally holding said first and second yoke members in fixed longitudinal and angular positions relative to each other.

4. A flexible coupling for connecting a driving shaft and a driven shaft,
   said coupling comprising a first yoke member and a second yoke member,
   each of said members having a pair of longitudinally extending leg portions and a base portion interconnecting said leg portions,
   said members being nested together with said base portion of said first member being interposed between said leg portions of said second member and said base portion of said second member being interposed between said leg portions of said first member,
   a resilient element interposed between said pair of leg portions of said first member and between said pair of leg portions of said second member,
   said resilient element normally holding said first and second yoke members in fixed longitudinal and angular positions relative to each other,
   said leg portions of said first and second members having longitudinal edges,
   said edges of said first yoke member being arranged in spaced apart paired relationship with said edges of said second yoke member,
   said resilient element having a plurality of radially extending flange portions with one of said flange portions being disposed between said spaced apart edges of each of said pairs,
   said flange portions being in engagement with said edges of one of said yoke members and normally spaced from said edges of the other of said yoke members.

5. A flexible coupling for connecting a driving shaft and a driven shaft,
   said coupling comprising a first yoke member and a second yoke member,
   each of said members having a pair of longitudinally extending leg portions and a base portion interconnecting said leg portions,
   said members being nested together with said base portion of said first member being interposed between said leg portions of said second member and said base portion of said second member being interposed between said leg portions of said first member,
   a resilient element interposed between said pair of leg portions of said first member and between said pair of leg portions of said second member,
   each of said leg portions having an aperture therethrough, said resilient element having lug portions extending radially through each of said apertures and in torque transmitting engagement with both of said yoke members,
said lug portions of said resilient element normally holding said first and second yoke members in fixed longitudinal and angular positions relative to each other,
said leg portions of said first and second members having longitudinal edges,
said edges of said first yoke member being arranged in spaced apart paired relationship with said edges of said second yoke member,
said resilient element having a plurality of radially extending flange portions with one of said flange portions being disposed between said spaced apart edges of each of said paris,
said flange portions being in engagement with said edges of one of said yoke members and normally spaced from said edges of the other of said yoke members.

6. A flexible coupling for connecting a driving and a driven shaft,
said coupling comprising a first U-shape yoke member and a second U-shape yoke member,
each of said members having a pair of longitudinally extending leg portions,
each of said leg portions having a base end and an attachment end,
each of said members having an integral base portion interconnecting said base ends of its pair of leg portions,
said members being nested together with said base portion of said first member being interposed between said leg portions of said second member and said base portion of said second member being interposed between said leg portions of said first member,
a resilient element interposed between said base portions of said first and second members and in torque transmitting engagement with said members,
each of said leg portions having an aperture therethrough,
said resilient element having lug portions extending radially through each of said apertures,
said lug portions engaging the edges of said apertures and said resilient element normally holding said first and second yoke members in fixed longitudinal and angular positions relative to each other,
said attachment ends of said leg portions of said first member being constructed to be connected to said driving shaft and said attachment ends of the leg portions of said second member being constructed to be connected to said driven shaft.

7. A flexible coupling for connecting a driving shaft and a driven shaft,
said coupling comprising a first U-shape yoke member and a second U-shape yoke member,
each of said members having a pair of longitudinally extending leg portions,
each of said leg portions having a base end and an attachment end,
each of said members having an integral base portion interconnecting said base ends of its pair of leg portions.
said members being nested together with said said base portion of said first member being interposed between said leg portions of said second member and said base portion of said second member being interposed between said leg portions of said first member.
a resilient element interposed between said base portions of said first and second members and in torque transmitting engagement with said members,
each of the edges of said leg portions extending in a generally radial direction with respect to the axis of rotation of said coupling to form longitudinally extending flanges,
said edges of said first and second yoke members being arranged in spaced apart pairs,
said resilient element having flange portions disposed between said spaced apart edges of each of said pairs,
said flange portions of said resilient element being in engagement with said edges of one of said yoke members and being spaced from said edges of the other of said yoke members,
said attachment ends of said leg portions of said first member being constructed to be connected to said driving shaft and said attachment ends of the leg portions of said second member being constructed to be connected to said driven shaft.

8. A flexible coupling for connecting a driving shaft and a driven shaft,
said coupling comprising a first U-shape yoke member and a second U-shape yoke member,
each of said members having a pair of longitudinally extending leg portions,
each of said leg portions having a base end end and an attachment end,
each of said members having an integral base portion interconnecting said base ends of its pair of leg portions,
said members being nested together with said base portion of said first member being interposed between said leg portions of said second member and said base portion of said second member being interposed between said leg portions of said first member,
a resilient element interposed between said base portions of said first and second members and in torque transmitting engagement with said members,
each of said leg portions having an aperture therethrough,
said resilient element having lug portions extending radially through each of said apertures,
the edges of said leg portions of said first and second yoke members being arranged in spaced apart pairs,
said resilient member having flange portions interposed between said spaced apart edges of each of said pairs,
said attachment ends of said leg portions of said first member being constructed to be connected to said driving shaft and said attachment ends of the leg portions of said second member being constructed to be connected to said driven shaft.

* * * * *